(12) United States Patent
Jarrett et al.

(10) Patent No.: US 6,375,846 B1
(45) Date of Patent: Apr. 23, 2002

(54) CYANOGEN BROMIDE-ACTIVATION OF HYDROXYLS ON SILICA FOR HIGH PRESSURE AFFINITY CHROMATOGRAPHY

(76) Inventors: Harry Wellington Jarrett, 6088 Lessa La., Bartlett, TN (US) 38134; Luis A. Jurado, 365 Almond Willlow Cove Apt. 2, Collierville, TN (US) 38017

( * ) Notice: Subject to any disclaimer, the term of this patent is extended or adjusted under 35 U.S.C. 154(b) by 0 days.

(21) Appl. No.: 09/682,922

(22) Filed: Nov. 1, 2001

(51) Int. Cl.$^7$ .............................................. B01D 15/08
(52) U.S. Cl. .................... 210/635; 210/656; 210/198.2; 210/502.1; 502/401; 502/439
(58) Field of Search ................ 210/635, 656, 210/198.2, 502.1; 502/401, 439

(56) References Cited

U.S. PATENT DOCUMENTS

| | | | |
|---|---|---|---|
| 4,835,058 A | * 5/1989 | Komiya | 210/198.2 |
| 5,043,062 A | * 8/1991 | Bale | 210/198.2 |
| 5,059,654 A | * 10/1991 | Hou | 210/198.2 |
| 5,178,756 A | * 1/1993 | Jarrett | 210/198.2 |
| 5,240,602 A | * 8/1993 | Hammen | 210/198.2 |
| 5,667,692 A | * 9/1997 | Muller | 210/635 |
| 5,670,049 A | * 9/1997 | Muller | 210/635 |

* cited by examiner

Primary Examiner—Ernest G. Therkorn

(57) ABSTRACT

The present invention provides for a method to prepare a pressure stable and pH stable medium for use in high pressure (performance) affinity chromatography. The method includes the steps of treating hydroxyalkyl-silica with cyanogen halides or other cyanogen transfer reagents in the presence of an organic base in anhydrous solvents at temperatures in the range of from about −15° C. to about 20° C. for a period of time in the range of from about 1 minute to about 5 minutes, and washing the resulting medium in anhydrous solvent.

8 Claims, 9 Drawing Sheets

Figure 5
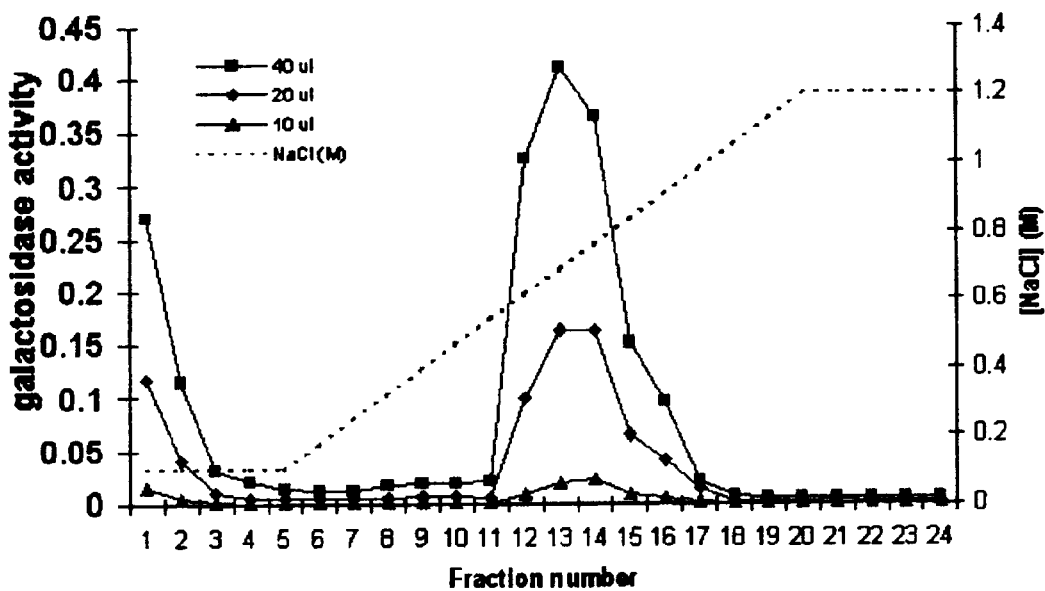
A  Freshly activated, freshly coupled
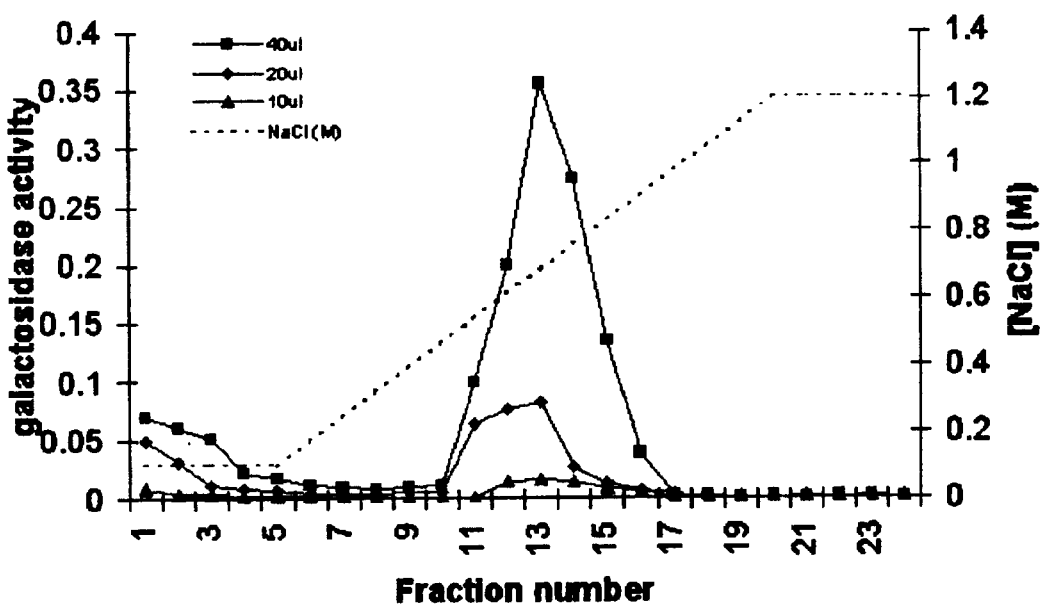
B  14 months after coupling

CYANOGEN BROMIDE-ACTIVATION OF HYDROXYLS ON SILICA FOR HIGH PRESSURE AFFINITY CHROMATOGRAPHY

FEDERAL RESEARCH STATEMENT

This invention was made with government support under 1R01GM43609 awarded by National Institutes of Health, United States Public Health Service. The government has certain rights in the invention.

BACKGROUND OF INVENTION

HPAC is a special form of affinity chromatography. Originally, affinity chromatography was performed at low pressures using media composed of beaded dextrans, celluloses, or agarose. Affinity chromatography is a form of chromatography which exploits the biological affinity of two or more molecules for one another. For example, biologically important enzymes bind to substrates with high affinity and specificity. By attaching the substrate to a suitable medium by some covalent or non-covalent linkage, the medium can then be packed into a column using aqueous buffers. When a mixture containing the enzyme of interest is applied to this column, the enzyme binds specifically to its substrate and remains in the column while most other components of the mixture have no affinity for the substrate and pass through the column un-retained. Later, the conditions can be changed to disrupt the enzyme-substrate binding and the enzyme elutes from the column in a highly purified form. The conditions which cause elution may be a change in pH, removal of some necessary cofactor, or addition of high amounts of substrate to the eluting solution. The same concept can be used to exploit the high affinity of antigens for antibodies, drugs for receptors, metals for certain proteins and nucleic acids, etc. Virtually any specific biological interaction of sufficiently high affinity can be exploited in affinity chromatography.

Closely related to affinity chromatography is a new method called Catalytic Chromatography reported by Jurado, et al., Analytical Biochemistry, Volume 282, pp. 39–45 (2000) which involves eluting enzymes from immobilized substrate columns by using the enzyme's catalytic activity to convert the substrate to product to cause elution. Catalytic chromatography can also be performed at high pressures and would benefit from the invention described. Here, affinity chromatography will be discussed but most of what would be said about it would also apply to catalytic chromatography and other variations of the affinity chromatography technique known to those having ordinary skill in the art of affinity chromatography.

Affinity chromatography requires three essential elements: 1) a chromatography medium which is stable to the conditions of chromatography, 2) some biologically relevant molecule with affinity for the subject of separation and 3) a method for attaching the molecule to the medium. The present invention relates primarily to the third.

At low pressures (1–6 bar), beaded polysaccharides provide an adequate medium. The most common way in which biological molecules are attached to these media is by activating them using cyanogen halides such as cyanogen bromide (CNBr) using chemistry originally pioneered by Axen, et al., Nature, Volume 214, pp. 1302–1304. This reaction occurs in strongly basic NaOH (pH 11) aqueous mixtures. The site of the activation reaction is with the hydroxyl groups on the polysaccharide medium. Indeed, virtually any compound containing a hydroxyl group will react with cyanogen halides to yield reactive cyanate ester and imidocarbonate derivatives. While both cyanate esters and imidocarbonate derivatives can result from the cyanogen bromide reaction, it is the cyanate esters that are most reactive and account for chemical coupling reactions, according to Kohn and Wilchek, Analytical Biochemistry, Volume 115, pp. 375–382 (1981). These cyanate esters in turn are particularly reactive with amines and other strong nucleophiles. For example, DiRusso, et al., Journal of Chromatography, Volume 677, pp. 45–52 (1994) used this reaction to activate Sepharose (a commercially available beaded agarose) with cyanogen bromide and then to chemically couple an oligonucleotide containing a 5'-aminoethyl group (5'—$NH_2$—$CH_2$—$CH_2$—$(dT)_{18}$) for affinity chromatography.

The importance of the cyanogen bromide activation reaction to modern science can hardly be overstated. The vast majority of affinity chromatography that has ever been performed used this coupling chemistry and literally thousands of separations have been reported based upon this coupling chemistry.

While this low pressure affinity chromatography is a very powerful technique, it is insufficient to provide the highest chromatographic resolution. Chromatographic theory and practice has shown that the highest resolution and best performance is obtained with very small diameter beaded support media. Unfortunately, as bead diameter decreases, the operating pressures required to maintain a certain flow rate increase. Current high performance (pressure) liquid chromatography (HPLC) uses 3–5 $\mu$m bead diameters and pressures as high as 350 bar. In contrast, beaded agaroses of 40–120 $\mu$m are normally used at low pressures of 1–6 bar and would be destroyed at higher pressures. To resist these high pressures, silica is the most commonly used HPLC support. To mask silanols on the silica surface which irreversibly absorb many important biological molecules such as proteins, the silica surface is coated by reaction with silanes. Most HPAC uses silicas which are initially reacted with glycidyloxypropyl silanes. This reaction produces an sepoxide-silica which itself will react slowly with amino ligands. The epoxide can also be hydrolyzed in weak acids to yield a diol silica and several chemistries exist for activating these hydroxyls for amino ligand coupling. For example, Larsson, et al., Advances in Chromatography, Volume 21, pp. 41.84 (1983) and Larsson, Methods in Enzymology, Volume 104, pp. 212–223 (1984) and Ernst-Cabrera and Wilchek, Journal of Chromatography, Volume 397, pp.187–196 (1987) have reported several such chemistries. For various reasons, none of these chemistries has been widely used. Some chemistries have reacted only slowly or in poor yield. Another inhibiting factor is that most of affinity chromatography has been performed with the cyanogen bromide activated supports and adapting each of these methods to a new chemistry, even if performance could be improved, would require a great deal of effort.

While silica is very pressure stable, it is unstable at pH values above pH 8 and is dissolved by strongly alkaline solutions such as those used in classical CNBr activation. An alternative to the use of NaOH has been provided by Kohn and Wilchek, Biochemical and Biophysical Research Communications, Volume 107, pp. 878–884 (1982). Using 60% acetone and the organic base triethylamine (TEA) in place of NaOH, they were able to activate agarose and other polysaccharide based support media with cyanogen bromide. While this reaction is somewhat safer to perform than the traditional CNBr chemistry, it still uses a strong organic base (TEA) which would be detrimental if used with silica. To perform other chemistry unrelated to this patent, Jarrett, Journal of Chromatography, Volume 405, pp. 179–189 (1987) had found that silica is not dissolved by organic bases such as pyridine if anhydrous conditions are maintained. This suggested to us that we may be successful in using a reaction similar to that of Kohn and Wilchek, Biochemical and Biophysical Research Communications, Volume 107, pp. 878–884 (1982) with silica except using strictly anhydrous conditions rather than aqueous acetone. This has now been demonstrated and provides the basis of the invention.

It is the object of the present invention to provide a medium for HPAC which is pressure stable, which shows improved resolution over current media, and uses the familiar CNBr chemistry.

It is a further object of this invention to provide a method for producing such a medium.

An examination of the following disclosure will allow a person having ordinary skill in the art to discern other objects and advantages of the present invention.

SUMMARY OF INVENTION

The present invention provides for a method to prepare a pressure stable and pH stable medium for use in high pressure (performance) affinity chromatography. The method comprises the steps of treating hydroxyalkyl-silica with cyanogen halides or other cyanogen transfer reagents in the presence of an organic base in anhydrous solvents at temperatures in the range of from about −15° C. to about 20° C. for a period of time in the range of from about 1 minute to about 5 minutes, and washing the resulting medium in anhydrous solvent.

In a preferred embodiment of the invention, the hydroxyalkyl-silica is glycidioloxypropyl-silica. In another preferred embodiment of the invention, the cyanogen transfer reagent is cyanogen bromide. In a further preferred embodiment of the invention, the organic base is triethylamine. In yet another preferred embodiment of the invention, the anhydrous solvent is selected from the group consisting of acetone, N,N-dimethylformamide, and 2-propanol. In a further preferred embodiment of the invention, the temperature is −15° C. and the period is 3 minutes. In another preferred embodiment of the invention, the temperature is 20° C. and the period is about 5 minutes.

In order to provide a better understanding of the present invention, the following Figures, along with the following Examples, are given by way of illustration to show certain specific details thereof.

BRIEF DESCRIPTION OF DRAWINGS

FIGS. 5A and 5B shows that the CNBr-activation and coupling procedures can be accomplished inside a pre-packed diol-silica column and that the columns are stable for over a year.

DETAILED DESCRIPTION

Figure 1:
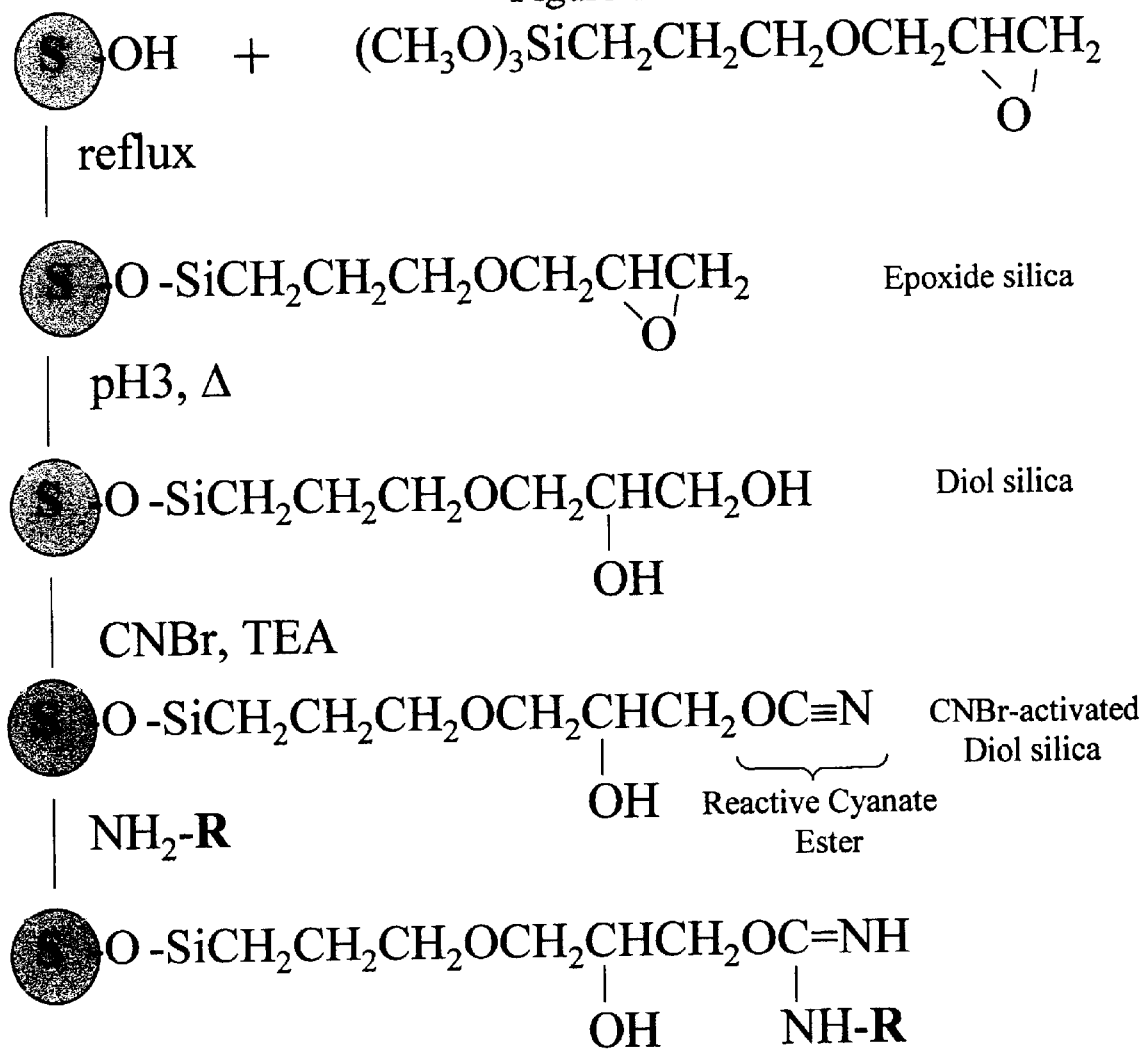
FIG. 1 is a diagram of the mechanism believed to occur at each step of the synthesis of cyanogen bromide-activated, hydroxyl-containing silica.

FIG. 1 is a diagram of the mechanism believed to occur at each step of the synthesis of cyanogen bromide-activated, hydroxyl-containing silica. It begins at bare silica (available commercially in various bead and pore diameters) and shows one possible way of producing an alcohol containing silica by reaction with glycidyloxypropyl trimethoxysilane (to yield an epoxide silica) which is then hydrolysed in weak acid to yield glycidioloxypropyl-silica (diol-silica). There are other ways of producing hydroxyl containing silicas which could also be activated by the present invention but this is the method originally described by Regnier and Noel, Journal of Chromatographic Science, Volume 14, pp. 316–320 (1976). The next step is the present invention and shows the reaction of a hydroxyl with cyanogen bromide under anhydrous conditions. The following steps show how this activated medium then reacts with any amine-containing ligand to covalently couple it.

Figure 2:
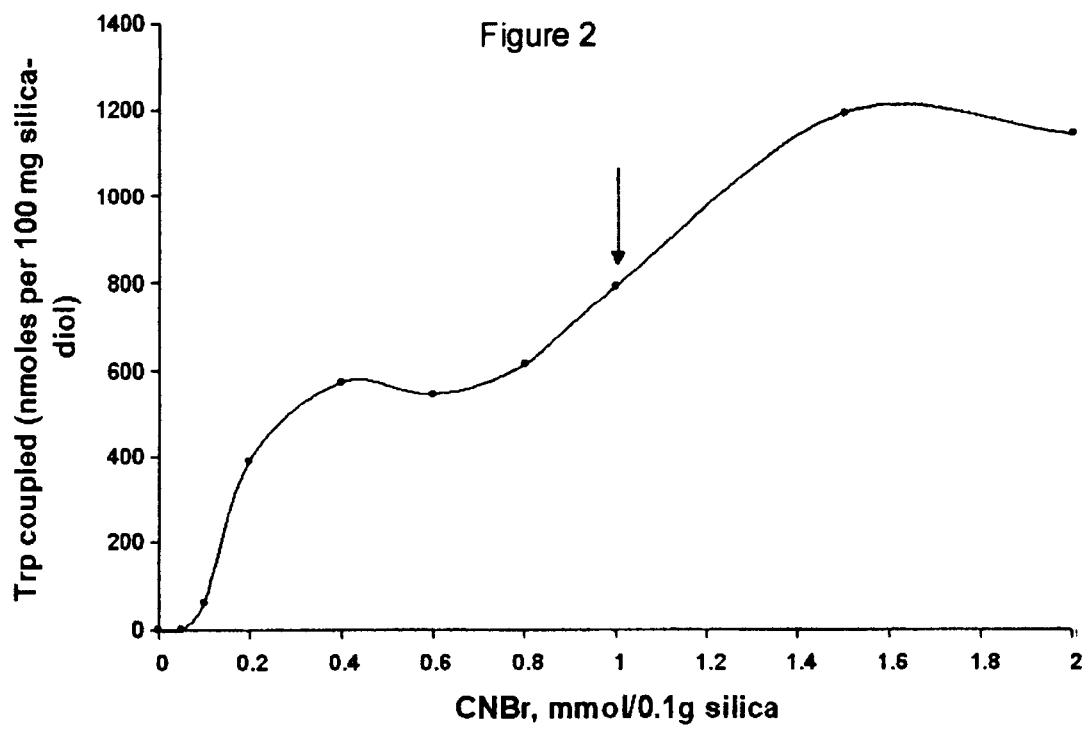
FIG. 2 shows the activation of diol-silica obtained with different amounts of CNBr.

FIG. 2 shows the activation of diol-silica obtained with different amounts of CNBr. For each mole of CNBr, 1.5 moles of TEA is added. Reaction is at −15° C. in anhydrous acetone and occurs over a time period of 3 min. At high levels of CNBr, an insoluble precipitate forms. The arrow shows the intermediate amount of CNBr used for all other studies. After CNBr-activation, the silica was thoroughly washed and added to coupling buffer containing 5000 nmol tryptophan (Trp), an amine ligand. The amount which coupled is shown.

Figure 3:
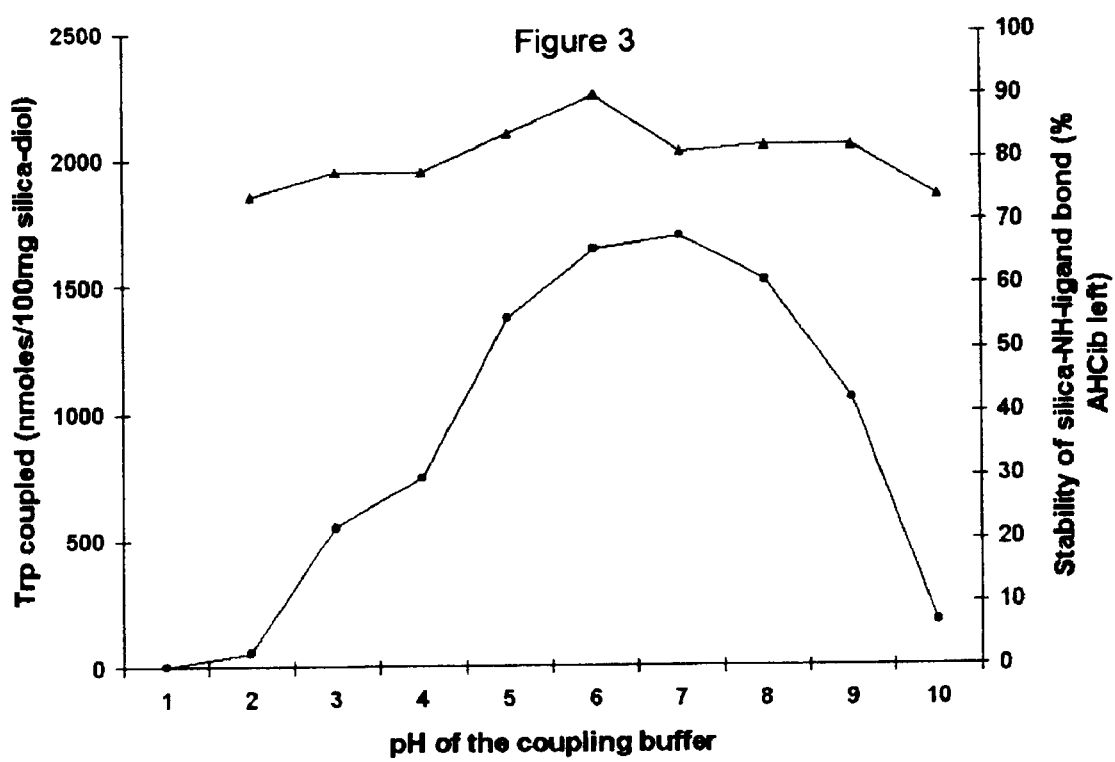
FIG. 3 shows the effect of pH on the coupling (circles) of tryptophan (Trp) and stability (triangles) of aminohexyl-cibacron (AHCib, a blue dye) coupled to CNBr-activated diol silica.

FIG. 3 shows the effect of pH on the coupling (circles) of Trp and stability (triangles) of aminohexyl-cibacron (AHCib, a blue dye) coupled to CNBr-activated diol silica. The coupling buffer was adjusted to each of the pH values shown, 5000 nmol Trp was added, and then freshly CNBr-activated diol-silica was added. The amount which coupled overnight is shown (circles). Coupling occurs over a wide range with the optimum from pH 6–8. For stability, AHCib was coupled to CNBr-activated diol-silica using the invention and then it was incubated in coupling buffer at different pH values for two hours. The coupled AHCib is stable from pH 2–10.

Figure 4:
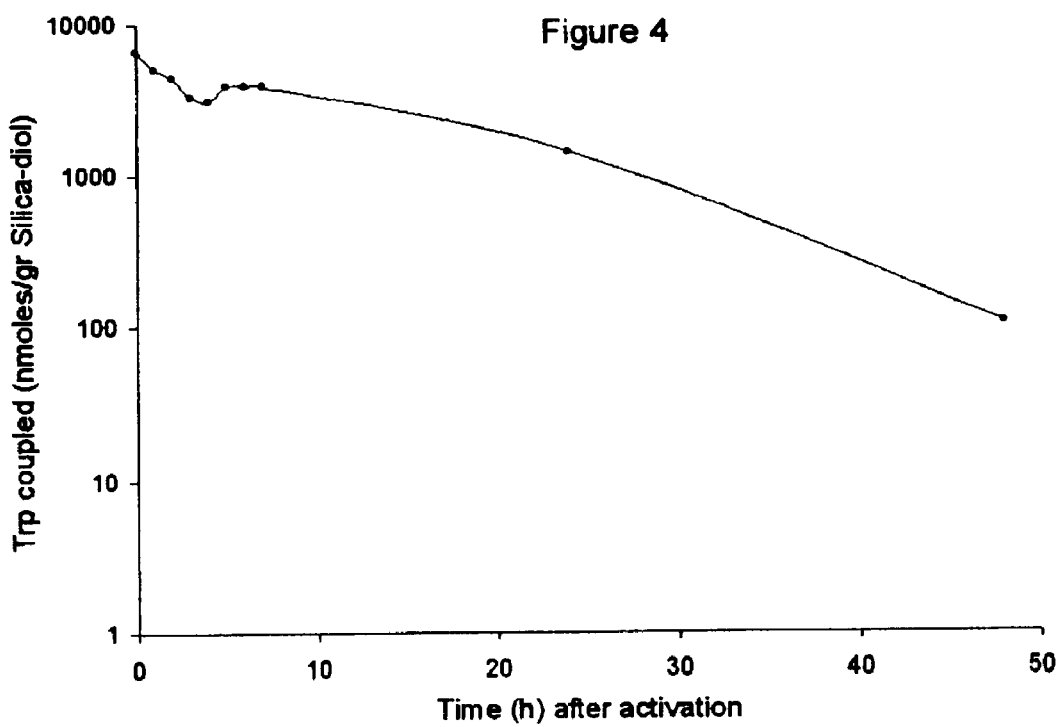
FIG. 4 shows that the CNBr-activated diol-silica is moderately stable in water.

FIG. 4 shows that the CNBr-activated diol-silica is moderately stable in water. Freshly activated silica was washed and suspended in water. Aliquots containing 100 mg of silica were taken at each time period shown and after equilibration with coupling buffer, tryptophan was added and allowed to couple.

FIG. 5 shows that the CNBr-activation and coupling procedures can be accomplished inside a prepacked diol-silica column and that the columns are stable for over a year. The column was a commercially available (Alltech) Macrosphere GPC 500 Å pore silica, 4.6×30 mm column. The column was equilibrated in anhydrous acetone at a flow rate of 1 ml/min. CNBr in acetone was pumped on the column and TEA was added with a second pump. After activation the column was thoroughly washed, equilibrated in coupling buffer and coupled to DNA. The same operator 1 DNA as in FIG. 7 was coupled and tested with the same lac repressor-β-galactosidase fusion protein, injecting either 10, 20, or 30 μl as shown in panel A. The same column was stored in 10 mM Tris, 1 mM EDTA, 0.1 M NaCl, pH 7.5 for 14 months and re-tested. This shows that that the columns prepared are quite stable for at least a year. The dashed line shows the NaCl gradient used to elute the column.

Figure 6:
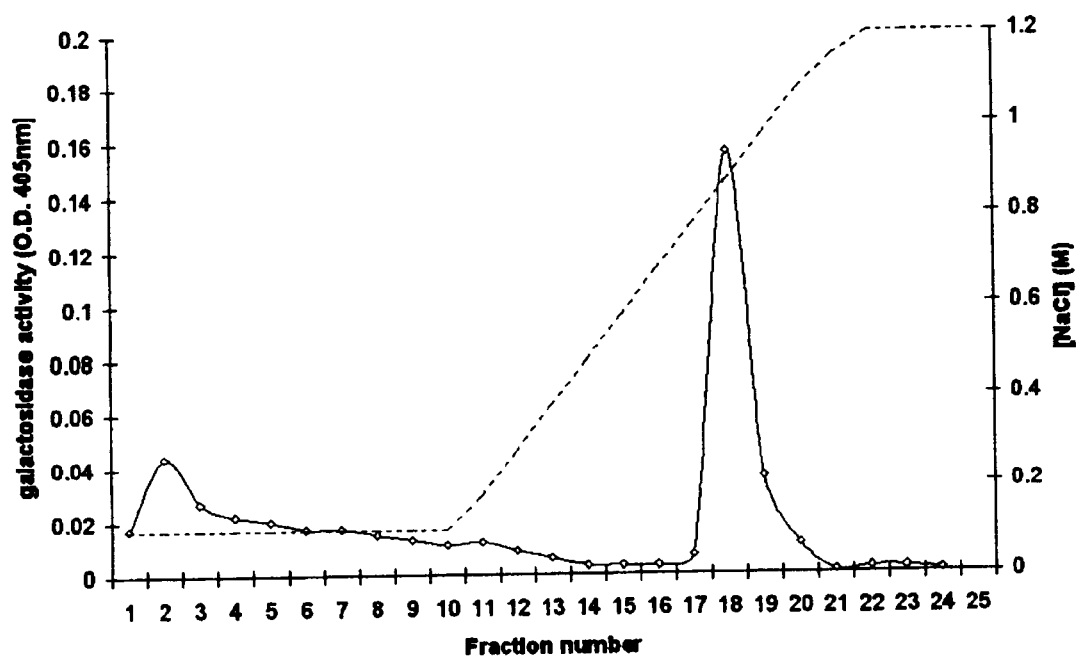
FIG. 6 shows that activated columns can be stored for at least three months prior to use for coupling.

FIG. 6 shows that activated columns can be stored for at least three months prior to use for coupling. At the same time the column used in FIG. 5 was made, a second identical column was in flow activated. After thorough washing, it was stored in anhydrous acetone for three months. It was then washed with water and coupling buffer, and then coupled to the same operator 1 DNA. The chromatogram in FIG. 6 was obtained by using the same conditions as in FIG. 5 and injecting 20 μl of the same lac repressor-β-galactosidase fusion protein. The column clearly behaves the same and also coupled a virtually identical amount of DNA.

Figure 7:
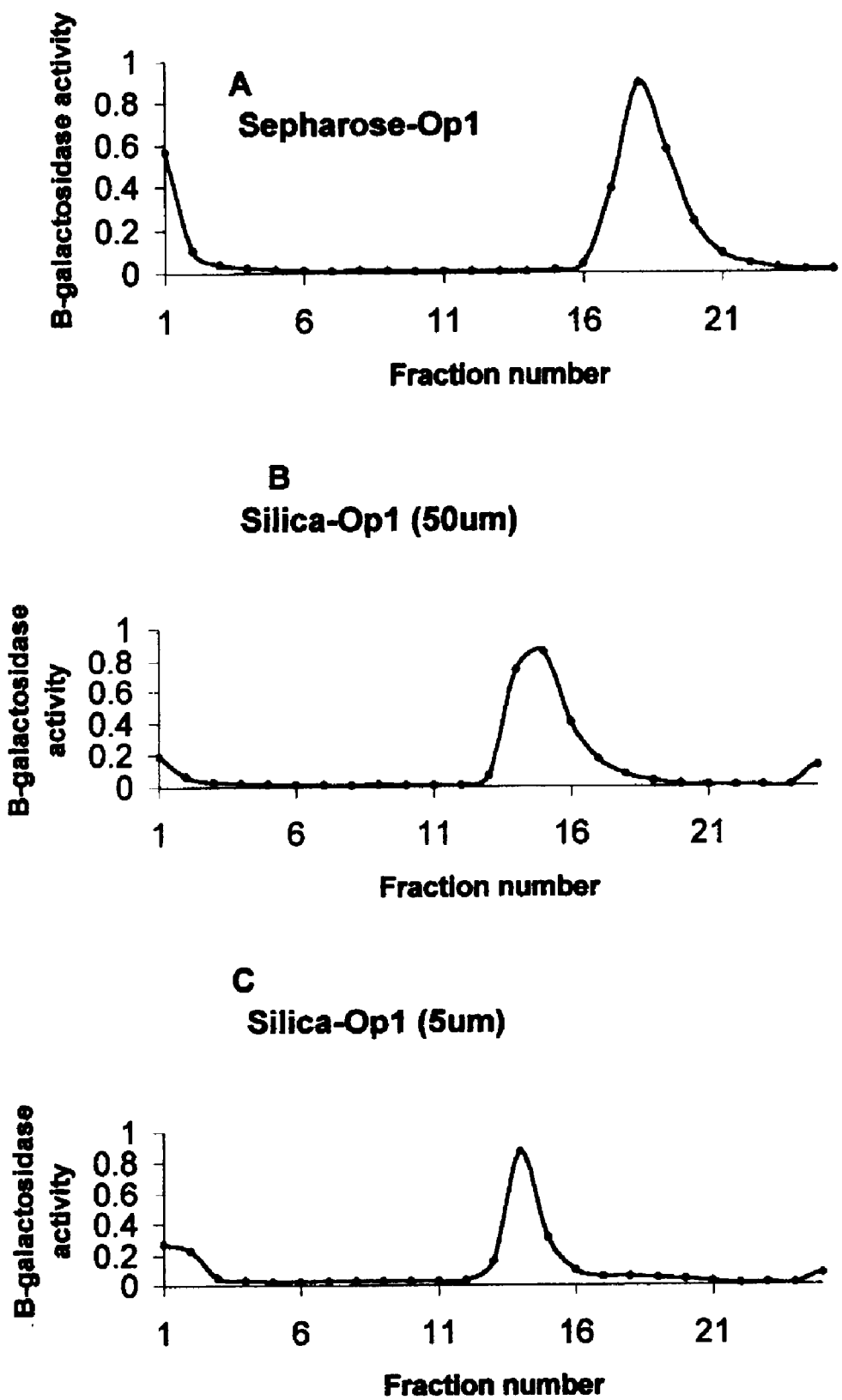
FIGS. 7A, 7B, and 7C show that CNBr-activated diol-silica gives the best chromatographic performance (e.g., narrow peak widths).

FIG. 7 shows that CNBr-activated diol-silica gives the best chromatographic performance (e.g., narrow peak widths). Using cyanogen bromide activation, a double stranded DNA containing the operator 1 sequence (bound by the lac repressor transcription factor) was coupled to Sepharose (panel A), or silica of bead diameter 50 μm (B) or 5 μm (C). An identical volume of each support was packed into identical columns and all other chromatographic conditions were identical in all experiments. A lac repressor-β-galactosidase fusion protein was then applied to each column and eluted with a salt gradient. Notice that Sepharose (40–120 μm beads) gives a broader peak than either silica, with the best performance found with 5 μm silica.

Figure 8:
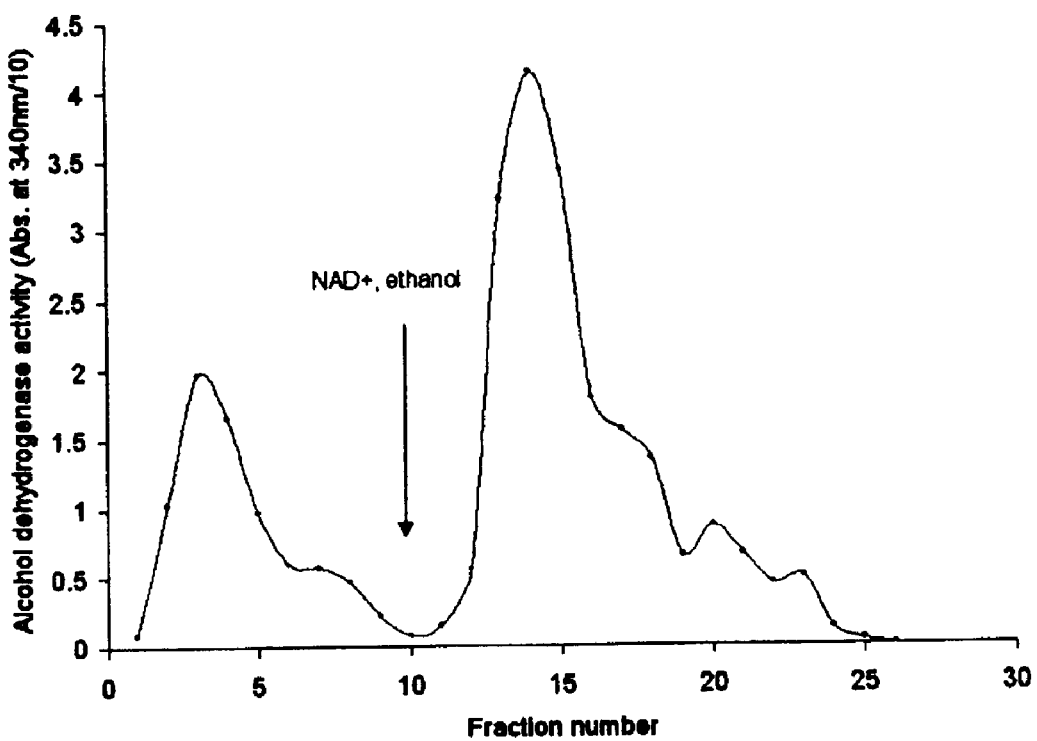
FIG. 8 shows the chromatography of alcohol dehydrogenase on an AHCib column, also prepared by in flow activation and coupling inside a pre-packed column.

FIG. 8 shows the chromatography of alcohol dehydrogenase on an AHCib column, also prepared by in flow activation and coupling inside a pre-packed column. Here, the support was Macrosphere 300 Å pore silica.

Figure 9:
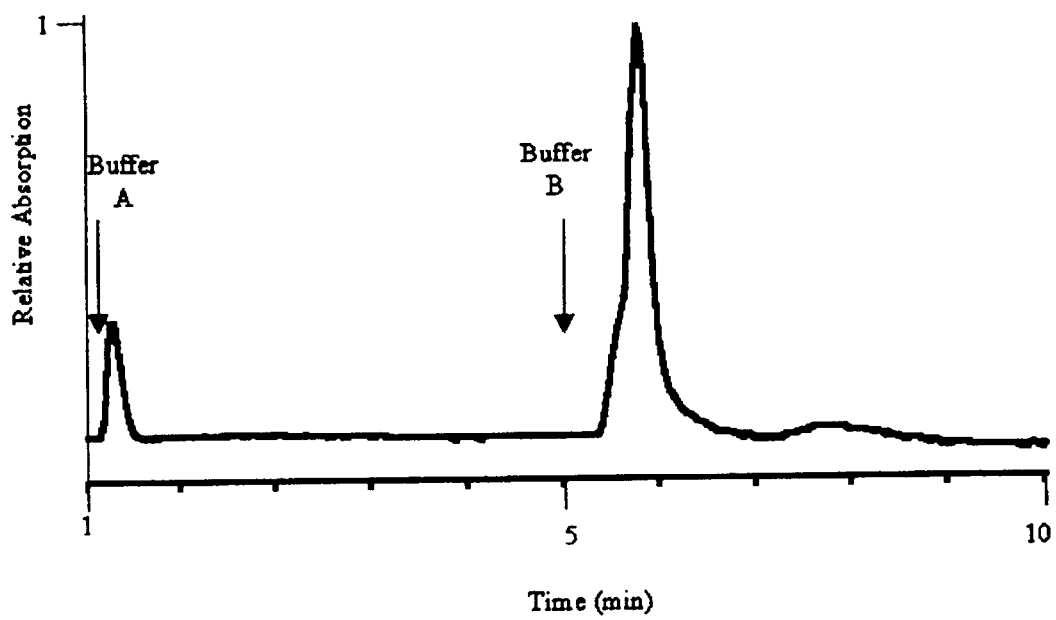
FIG. 9 shows the chromatography of the protein calmodulin on a melittin-silica column, also prepared by in flow activation and coupling.

FIG. 9 shows the chromatography of the protein calmodulin on a melittin-silica column, also prepared by in flow activation and coupling. Calmodulin binds the peptide melittin in the presence of calcium (present in buffer A) but doesn't bind and elutes in EGTA (present in buffer B). In this case, the silica was also Macrosphere GPC 300 Å pore silica, except that we packed it into a 4.6×50 mm column prior to in flow activation and coupling.

In order to provide a better understanding of the present invention, the following Examples are given by way of illustration to show certain specific details thereof.

EXAMPLE 1
Suitable Starting Materials

To prepare a suitable silica for CNBr activation, 10 g. porous silica with pores of 60, 300, or 500 Å and in bead diameters of 5, 7, or 50 μm was refluxed from 4–6 hours with 10% glycidyloxypropyl trimethoxysilane in toluene. The silica was then washed with toluene, acetone, and ether and dried overnight under vacuum. The silica was then added to 100 ml. water and titrated to pH 2.8 with trifluoroacetic acid and heated in a boiling water bath for 2 hrs. The resulting diol-silica was washed with water, acetone, and ether and dried under vacuum. The diol-silica is believed to have the structure diagrammed in FIG. 1.

Many different commercially available HPLC-grade silicas could be used for the present invention in place of synthesized diol-silica. Indeed, most of the silicas currently used for size exclusion of gel permeation chromatography (GPC) would contain hydroxyl groups and could be activated by the present invention. We have shown that Alltech Macrosphere GPC in the 300 and 500 Å pore and 7 μm bead diameter and the Platinum Exmer 300 Å pore, 5 μm bead can be activated by the present invention.

EXAMPLE 2
Activation of Diol-silica

One gram of diol-silica (50 μm bead, 300 Å pore prepared from Machery-Nagel Polygoprep as described in Example 1) was suspended in 5 ml anhydrous acetone in a thick walled plastic tube. A vacuum was applied and the tube was immersed in a bath-type sonifier and sonicated for 5 min. The suspension was transferred to a 50 ml beaker and excess acetone was removed to leave an easily mixable slurry. This, and all necessary reagents, were immersed in a methanol bath and small chips of dry ice (solid $CO_2$) added until the temperature was a constant −15° C. One ml of 1 M CNBr (1 mmole) in anhydrous acetone was added and the beaker swirled to mix. A timer was started and 1 ml of 1.5 M triethylamine in anhydrous acetone was added dropwise over a 3 min. time period while swirling the beaker. The reaction mixture was then rapidly filtered on a sintered glass filter funnel and the silica washed with 50 ml ice cold (0° C.) acetone, 50 ml ice cold water, and finally 100 ml ice cold coupling buffer (0.1 M $NaHCO_3$, pH 8.3, 0.5 M NaCl) and left as a semi-dried cake. The silica is now activated and can couple amino ligands. The activated silica is believed to have the structure represented by the fourth support from the top of the page shown in FIG. 1.

EXAMPLE 3
Coupling pH and pH Stability

Tryptophan was coupled by adding a portion of the activated, semi-dried cake from Example 2 containing 0.1 g. silica to 0.5 ml of 10 mM tryptophan (5 μmol) in coupling buffer (0.1 M $NaHCO_3$, pH 8.3, 0.5 M NaCl). This was mixed by tumbling overnight at 20° C. The next day, the silica was washed thoroughly with coupling buffer (0.1 M $NaHCO_3$, pH 8.3, 0.5 M NaCl) and the washes recovered. The amount of tryptophan in the washes was quantified by absorption of 272 nm ultraviolet light. By difference we found that 2.8 μmol trp (52%) coupled or 28.4 μmol trp/g. CNBr-activated diol-silica. When the same procedure was performed except that no CNBr was used (and 1 ml acetone used in its place) no detectable trp coupled. The silica is left in blocking buffer (0.1 M Tris, pH 8.0, 0.5 M NaCl) overnight to consume any remaining reactive groups before the silica is used for chromatography. The product of the coupling reaction is believed to be that depicted in the last support shown in FIG. 1 where $NH_2$—R represents Trp.

The activation reaction was optimized by following Trp coupling. In FIG. 2 we show the results of an experiment to determine the proper amount of each reagent to use. TEA was always added at 1.5 mol/mol CNBr. At CNBr<1 mmol (see arrow), lower amounts of Trp coupled, while at CNBr>1 mmol, a yellow precipitate forms which interferes with filtration. Thus, we used 1 mmol CNBr and 1.5 mmol TEA as described initially.

The optimal pH for coupling was also investigated and the results are presented in FIG. 3. Trp coupled best over the pH range 6–8 (FIG. 3, circles). To determine the pH stability of coupled ligands, AHCib (a blue dye which is easily measured) was coupled to CNBr-activated diol-silica. This was resuspended in coupling buffer of pH 2–10 and mixed by tumbling for two hours. Each support was then washed with pH 8.3 coupling buffer and suspended in 25% glycerol and the absorption at 620 nm determined for the starting material silica (defined as 100%) and each of the pH-treated silicas. The AHCib-silica is stable from pH 2–10.

EXAMPLE 4
Stability of the Activated Silica in Various Solvents

Diol-Silica was activated as in Example 2, washed, and then suspended in ice-cold water. At various times, a portion containing 0.1 g silica was removed and mixed with trp and coupled overnight. The results in FIG. 4 show that the reaction with water is (pseudo) first order with a half-time of 8.3 hours at 0° C. Thus, hydrolysis in water is slow enough that the CNBr-activated silica can be thoroughly washed by filtration without significantly affecting the amount of activation, even if filtration is relatively slow. However, long-term storage in water would not be feasible.

Long term storage is feasible in anhydrous acetone, however, as shown in FIGS. 5 and 6. Diol-Silica was activated as in Example 2 except that the activation reaction was carried out inside a pre-packed diol-silica column (Alltech Macrosphere GPC, 7 μm diameter, 500 Å pore, 4.6×30 mm column) by flowing in the appropriate reagents. At the same time, a second, identical column was also activated, thoroughly washed with anhydrous acetone and stored in acetone at room temperature. 5'-aminoethyl operator 1 DNA (5'—$NH_2CH_2CH_2$—$(T)_6$-AATTGTATCCGCTCACAATTCCAC-3') in coupling buffer was then flowed through the first column and re-circulated overnight. The column was then made double stranded by annealing the second, complementary strand (S'—$NH_2$—$CH_2$ $CH_2$-GTGCAATTGTGAGC GGATAACAATT-$(A)_6$-3'). The resulting double-stranded DNA column was then tested by injecting various amounts of a lac repressor-β-galactosidase fusion protein onto the column. The results in FIG. 5A show that this freshly-activated-and-then-coupled column binds the lac repressor protein which then elutes with an increasing salt gradient. The second column was stored for 3 months in anhydrous acetone and then coupled to the same DNA in the same way. When 20 μl of the lac repressor-β-galactosidase fusion protein was injected, the protein bound to the column and eluted as shown in FIG. 6. Thus, even activated columns stored for as long as three months can still couple DNA and perform affinity chromatography.

EXAMPLE 5
Stability of Chromatographic Performance

The freshly coupled DNA-silica column shown in FIG. 5A was also tested 14 months later and the results are shown in FIG. 5B. After prolonged storage (in 10 mM Tris, pH 7.5, 0.1 M NaCl, 1 mM EDTA), the column retains its chromatographic performance.

EXAMPLE 6
Comparison to the Prior Art

The same operator 1 DNA was coupled to CNBr-activated Sepharose (40–120 μm bead diameter), 50 p m diol-silica, or 5 μm diol-silica. Each support was made double stranded by annealing the complementary strand and slurry packed into 5×50 mm columns. Each was then attached to a chromatograph and identical amounts of the lac repressor-β-galactosidase fusion protein was applied to each column and the columns eluted with an identical salt gradient. The results are shown in FIG. 7. Chromatographic performance, as measured by peak width, is clearly the worst for Sepharose (the prior art), is marginally better for the 50 μm silica, and is best of all for the 5 μm silica (with a peak width only half as large as the Sepharose). Thus, CNBr-activated diol-silica gives significantly better chromatographic performance than does Sepharose.

EXAMPLE 7
Versatility of Coupling Various Types of Ligands Including the Peptide Mellitin The examples already provided have shown that the invention, CNBr-activated hydroxyl containing silica, can couple an amino acid (tryptophan, FIGS. 2, 3, 4), an amine-containing dye (AHCib, FIG. 3, 8) and a DNA (operator 1, FIGS. 5, 6, 7). AHCib is commonly used as a ligand for the affinity chromatography of dehydrogenases and FIG. 8 shows that AHCib-silica prepared using the invention also is useful for the affinity chromatography of alcohol dehydrogenase, as expected. Finally, FIG. 9 shows that coupling of melittin, a peptide, can be coupled to silica using the present invention and used for the affinity chromatography of the protein calmodulin. Thus, amino acids, amino dyes, DNA, and peptides (or proteins), all compounds containing amino groups, can be coupled by the invention and thus any amino ligand should couple using this chemistry.

EXAMPLE 8
Application to Various Hydroxyl-containing Silicas

The examples already presented also show that diol-silica produced as in Example 1 (FIGS. 2, 3, 4, and 7), or obtained commercially as Alltech Macrosphere GPC in 300 or 500 Å and 7 μm diameter (FIGS. 5, 6, 8, 9) or Alltech Platinum Exmer 300 Å and 5 μm (FIG. 7) all can be used. The present invention is applicable to a variety of hydroxyl-containing silicas.

EXAMPLE 9
Activation and Coupling Inside Prepacked Columns

The invention can be performed in a beaker as in Example 2, or inside commercially available, prepacked columns (FIGS. 5 and 6), or inside a column prepacked by the user with a support of choice (FIG. 8). The column is first washed with anhydrous acetone. The pumps are then configured so that chemicals can be recirculated through the column. Then 1 ml of 1 M CNBr in acetone is pumped into the column and, while recirculating, 1 ml of 1.5 M TEA is added over three min. The column is then immediately washed with acetone. All operations are carried out at room temperature (20° C.). For coupling, the column is washed with water, coupling buffer, and then again configured to allow recirculation. The ligand to be coupled, dissolved in coupling buffer, is then recirculated through the column overnight.

EXAMPLE 10
Use of Other Solvents

The same CNBr-activation procedure as in Example 2 was carried out in anhydrous acetone, 2-propanol, and N,N-dimethylformamide. Trp was then coupled as in Example 2. The results (average±standard deviation for triplicates) are: [t2]

TABLE 1

| Solvent | Trp coupled, nmoles per 0.1 g Sidiol | % Coupled |
|---|---|---|
| Acetone | 2,107 ± 455 | 40 |
| Dimethylformamide | 1,939 ± 122 | 37 |
| 2-Propanol | 1,649 ± 153 | 32 |

Thus, the present invention can be carried out in other organic solvents as long as they are anhydrous.

The present invention provides a method for preparing a medium for high pressure affinity chromatography (HPAC). The cyanogen bromide-activated, hydroxyalkyl-silica of the present invention provides a distinct advantage over media previously available. For example, cyanogen bromide-activated, hydroxyalkyl-silica provides better chromatographic performance than the prior art, can be performed inside a prepacked column, and can be stored in an activated state ready for coupling for at least three months.

Although particular embodiments of the invention have been discussed, it will be understood that these are examples that were described for the purpose of illustration and that the invention is capable of numerous modifications without departing from the spirit of the invention. In particular, it is noted that a wide variety of bead diameters and pore sizes may be used to prepare the media of the present invention. In addition, various hydroxyalkyl-silica supports may be used to prepare the media of the current invention. Furthermore, the reaction described may be performed with other cyanogen halides, cyanogen transfer reagents, and in different anhydrous solvents. Finally, organic bases other than triethylamine could be used for the present invention.

Various features of the invention which are believed to be new are set forth in the appended claims.

What is claimed is:

1. A method to prepare a pressure stable and pH stable medium for use in high performance affinity chromatography, the method comprising the steps of treating hydroxyalkyl-silica with cyanogen transfer reagent in the presence of an organic base in anhydrous solvents at temperatures in the range of from about −15° C. to about 20° C. for a period of time in the range of from about 1 minute to about 5 minutes, and washing the resulting medium in anhydrous solvent.

2. The method in claim 1 wherein the hydroxyalkyl-silica is glycidioloxypropyl-silica.

3. The method in claim 1 where the cyanogen transfer reagent is cyanogen bromide.

4. The method in claim 1 where the organic base is triethylamine.

5. The method in claim 1 where the anhydrous solvent is selected from the group consisting of acetone, N,N-dimethylformamide, and 2-propanol.

6. The method in claim 1 where the temperature is about −15° C. and the period is about 3 minutes.

7. The method in claim 1 where the temperature is about 20° C. and the period is about 5 minutes.

8. The method of claim 1 where the cyanogen transfer agent is a cyanogen halide.

* * * * *